March 26, 1957 — W. W. WATROUS, JR — 2,786,956
ADJUSTABLE BAFFLE FOR GASEOUS DISCHARGE DEVICES
Filed Aug. 19, 1954 — 3 Sheets-Sheet 1

WARD W. WATROUS, JR.
INVENTOR

BY Ralph E. Bitner
ATTORNEY

March 26, 1957 W. W. WATROUS, JR 2,786,956
ADJUSTABLE BAFFLE FOR GASEOUS DISCHARGE DEVICES
Filed Aug. 19, 1954 3 Sheets-Sheet 2

WARD W. WATROUS, JR.
INVENTOR

BY Ralph E. Bitner

ATTORNEY

March 26, 1957 — W. W. WATROUS, JR — 2,786,956
ADJUSTABLE BAFFLE FOR GASEOUS DISCHARGE DEVICES
Filed Aug. 19, 1954 — 3 Sheets-Sheet 3

WARD W. WATROUS, JR.
INVENTOR

BY Ralph E. Bitner
ATTORNEY

2,786,956

ADJUSTABLE BAFFLE FOR GASEOUS DISCHARGE DEVICES

Ward W. Watrous, Jr., Chatham, N. J., assignor, by mesne assignments, to Gera Corporation, New York, N. Y., a corporation of New Jersey Application August 19, 1954, Serial No. 451,004

6 Claims. (Cl. 313—204)

This invention relates to gaseous discharge devices and has particular reference to a form of baffle which is interposed between the cathode and the control electrode and which is adjustable in shape in proportion to the temperature.

The use of baffles in gaseous discharge devices is common in the prior art since these structures are useful in preventing "flash-back" or conduction in the reverse direction and also in preventing conduction in the forward direction when the control electrode is regulated for non-conduction. In addition, baffles are useful for directing the gaseous discharge toward a desired region in the space adjoining the electrodes.

The present invention is directed to a structure which comprises an adjustable baffle having a plurality of fingers projecting into the space normally occupied by the gaseous discharge. The fingers are made of bi-metallic material which will alter its shape when subjected to differences in temperature. The fingers are positioned so as to obstruct the gaseous discharge when concentrated at a particular region near the anode and by this obstruction cause the discharge to move to some other region.

One of the objects of this invention is to provide an improved design of gaseous discharge device including an adjustable baffle arrangement which prevents the gaseous discharge from remaining at any one discharge region for any length of time.

Another object of the invention is to distribute the heat generated by the gaseous discharge over the entire area of the anode.

Another object of the invention is to protect the control electrode from buckling caused by unequal heating.

The invention comprises a gaseous discharge device having an envelope containing gas at a reduced pressure and a cathode which is heated to emit a large supply of electrons. A shielded anode is provided which is connected to a high potential source and attracts electrons when the potential of a control electrode is raised sufficiently positive to initiate a discharge. The control electrode is positioned between the anode and cathode and is adjacent to an adjustable baffle having a plurality of fingers extending into the discharge space. The fingers are constructed of two metals having different temperature coefficients of expansion and the fingers are arranged to give greater obstruction to the gaseous discharge when their temperature is raised.

For a better understanding of the present invention, together with other and further objects thereof, reference is made to the following description taken in connection with the accompanying drawings.

Figure 1:
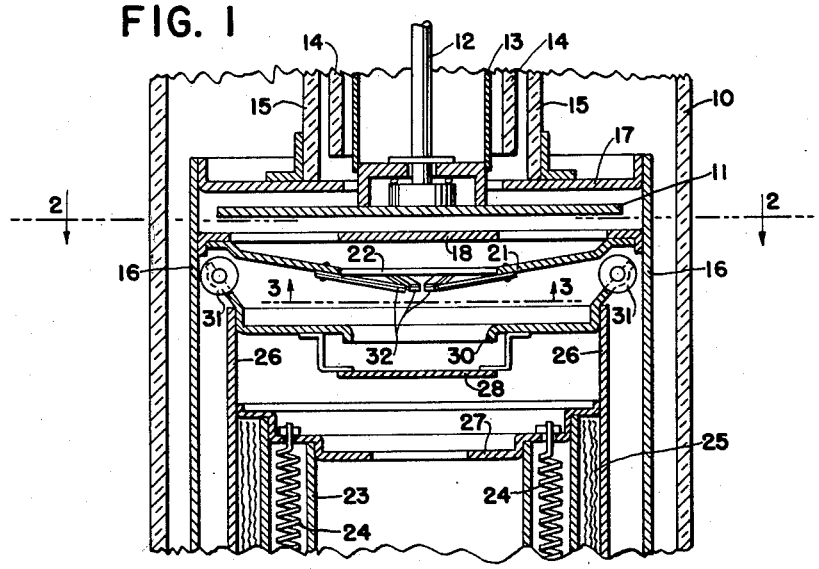
Fig. 1 is a sectional view of a portion of a gaseous discharge tube.
Figure 2:
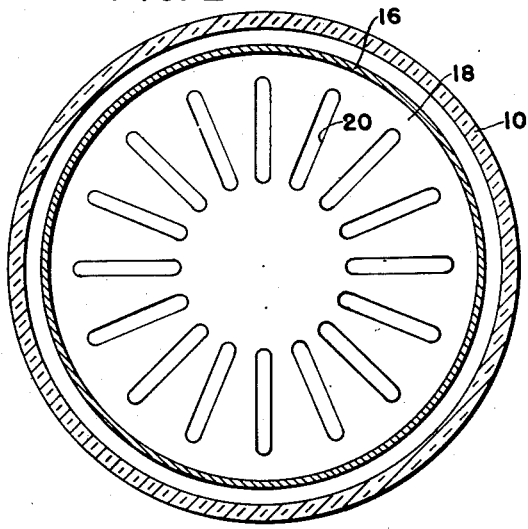
Fig. 2 is a sectional view taken along line 2—2 of Fig. 1 and showing the construction of the control electrode.

Referring now to Figs. 1 and 2 the gas discharge is enclosed by a glass envelope 10. An anode 11 is positioned within the envelope and supported by a rod 12 which is used as a lead-in conductor. The anode support includes a metallic shield 13 and two glass cylinders 14 and 15 to aid in supporting the anode structure and to help insulate the other components in the tube from the high voltage which is applied to the anode 11 and its lead-in conductor 12. Surrounding the anode is a shield 16 which is secured to a top shield plate 17 and a control electrode 18 mounted parallel to the anode 11.

The control electrode 18 is formed with a plurality of radial slots 20 as indicated in Fig. 2 but any other form of perforated conductor may be used for the control electrode. Immediately below the control electrode and secured to it is a baffle plate 21 having a centrally aligned hole 22 for the passage of the gaseous discharge.

The cathode surface 23 is in the form of a hollow cylinder with a plurality of heater coils 24 surrounding the cylindrical emitting surface. A heat shielding device 25 includes an annular chamber filled with aluminum foil but this heat shielding device is not necessary for the operation of the discharge. A cylindrical shield 26 supports the cathode and an arrangement of baffles 27, 28, and 30, designed to direct the gaseous discharge while at the same time shielding the control electrode and the anode from the heat generated by the cathode heaters 24. The cathode structure is insulated from shield 16 by several insulator rollers 31 which also maintain the cathode in alignment and provide an easy and convenient means for assembling the device during manufacture.

The cathode structure has been described and claimed in U. S. Patent 2,650,997 issued September 1, 1953, to W. W. Waltrous, Jr. Other patents which give further details of the structure and function of similar discharge devices are as follows: U. S. Patents 2,650,998 issued September 1, 1953; 2,653,261 issued September 22, 1953; and 2,644,101 issued June 30, 1953, all to W. W. Waltrous, Jr.

Figure 3:
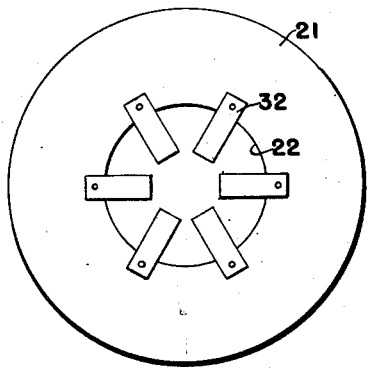
Fig. 3 is a sectional view taken along line 3—3 of Fig. 1 showing the adjustable baffle fingers.
Figure 4:
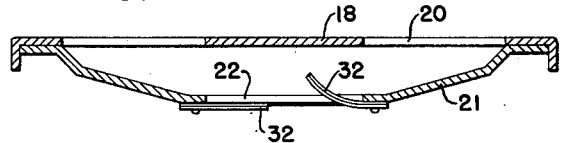
Fig. 4 is a sectional view showing an alternate construction of the baffle fingers.

The central hole 22 in baffle plate 21 is partly filled with a plurality of fingers 32 which are riveted or spot welded at one end to the baffle plate near the edge of the hole and extend toward the center of the hole (see Fig. 3). The bi-metallic fingers 32 are the usual combination of two metals joined by welding or brazing which change their shape when subjected to high temperatures. Fig. 4 illustrates the manner in which the fingers 32 are employed to obstruct the passage of the electric discharge through the baffle hole 22 and through the slots 20 in the control electrode. The finger on the left in Fig. 4 is the normal shape at room temperature or in the vicinity of several hundred degrees centigrade. The finger on the right in Fig. 4 represents the shape after the finger has been heated to an elevated temperature by the passage of the discharge in the immediate vicinity of the right hand finger. It is characteristic of this type of baffle arrangement to produce a discharge which travels through one side of the control electrode, traversing only a few slots 20 and heating the control electrode and the anode to a very high temperature in that vicinity. When this action occurs one or two fingers 32 will also be selectively heated and will curl into the discharge space while the other fingers remain flat or nearly so. With this obstruction the discharge moves to one side, heating up other fingers and other portions of the control electrode and anode. The result is that the discharge, while still confined to a limited portion of the available discharge path, will move slowly around the anode surface thereby producing an equal heating effect on both the anode and control electrode. The speed with which the discharge moves is proportional to the characteristics of the bi-metallic fingers. If the fingers are slow to respond to changes of temperature the discharge will move slowly. If the fingers are made more sensitive by the proper selection of metals and by the use of thin materials, the gaseous discharge can be made to move rapidly around the anode.

Figure 5:
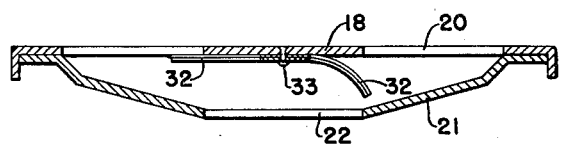
Fig. 5 is a sectional view showing another alternate construction of the baffle fingers.
Figure 9:
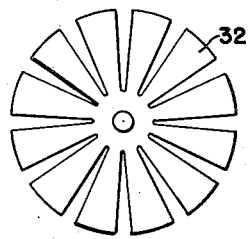
Fig. 9 is a bottom view of the baffle fingers used in the construction shown in Fig. 5.

The drawing in Fig. 5 shows the fingers mounted on the control electrode and arranged to curl downwardly toward baffle 21 when heated. This action produces the same result. The fingers shown in Fig. 5 may be made in one piece as illustrated in Fig. 9 and a single rivet 33 used to hold the bi-metallic element in place.

Figure 6:
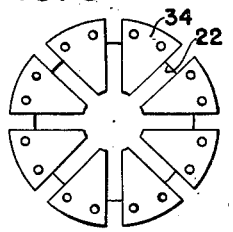
Fig. 6 is a bottom view similar to Fig. 3 but showing baffle fingers having a different shape.
Figure 7:
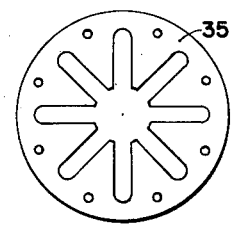
Fig. 7 is a bottom view of the baffle fingers similar to Fig. 6 but showing the fingers formed from a single sheet of the bi-metallic material.

Fig. 6 shows the bottom view of baffle 21 with bi-metallic fingers 34 mounted around the edge of hole 22. Fingers 34 are formed with a wide base and a pointed free end in order to have greater control of the discharge position. Fig. 7 is a bottom view of the finger assembly similar to Fig. 6 but indicating the manner in which all the fingers may be made of a single piece 35.

Figure 8:
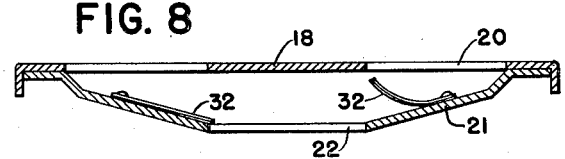
Fig. 8 is a sectional view showing still another alternate arrangement of the baffle fingers.

Fig. 8 shows another alternate arrangement of the bi-metallic fingers. The bi-metallic elements 32 are mounted on the upper side of baffle plate 21 and riveted or spot welded near the periphery of the plate. This construction leaves the hole 22 in baffle plate 20 unobstructed at the start of the discharge action and creates an obstruction to the discharge only after a considerable time has elapsed. The final results of this arrangement are the same as described above except that the discharge moves around the anode more slowly.

Figure 10:
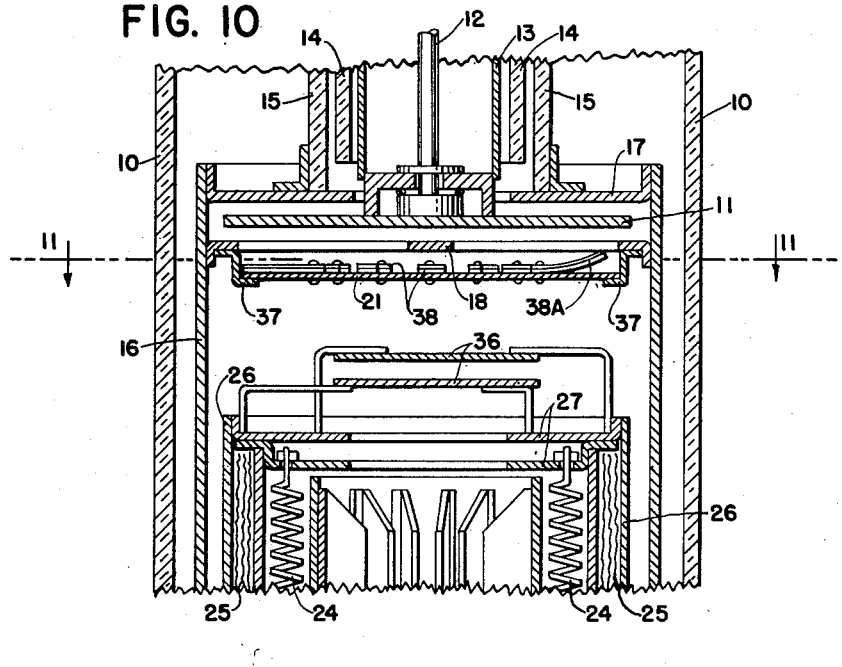
Fig. 10 is a sectional view of a portion of a gaseous discharge tube similar to the one shown in Fig. 1 but employing the "rim fire" type of baffle arrangement.
Figure 11:
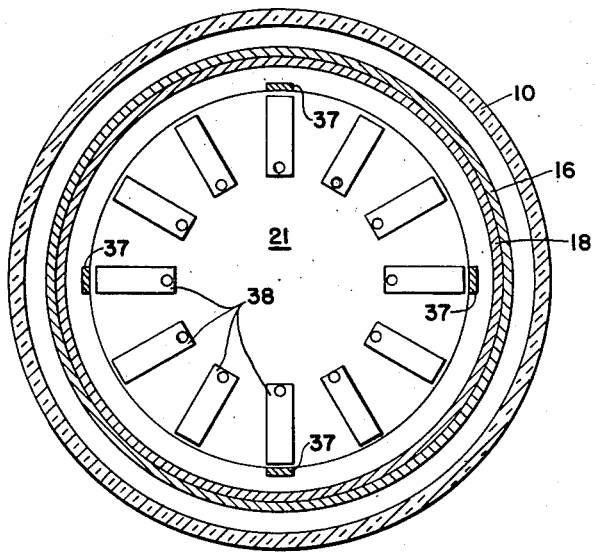
Fig. 11 is a sectional view of the tube of Fig. 10 and is taken along line 11—11 of that figure.

The above described baffle fingers have been part of a "center fire" gaseous discharge tube, so called because of the fact that the baffle plate 21 nearest the control electrode has a central hole 22 through which the discharge must travel. The present invention may also be applied to the older or "rim fire" type of discharge tube as illustrated in Figs. 10 and 11. This tube arrangement contains the same anode 11 and lead-in conductor 12. The shield 16 and the cathode are also substantially the same. Baffle plates 36 are designed to shield the anode and control electrode assembly from the heat generated by the cathode. The control electrode baffle plate 21 is a solid flat circular disk mounted below the control electrode by four small brackets 37. When the tube is fired the discharge passes from the cathode, around the baffle plates 36, through the space between the rim of baffle 21 and the control electrode 18, through the slots or perforations in the control electrode, to the anode 11.

The bi-metallic fingers 38 are riveted or spot welded to baffle plate 21 as shown and normally lie flat on the plate surface. When the discharge occurs, the temperature of the adjacent parts is raised and the fingers move upwardly as indicated by 38A to form a partial barrier and cause the discharge to move to some other part of the rim opening.

When the above described discharge devices are operating at reduced current values the heating effects will be much less pronounced and the discharge will move around the anode very slowly if at all. The absence of discharge movement at low current values is of minor importance since under those conditions the heating effects cause little damage and the regulation is not necessary.

While there have been described and illustrated specific embodiments of the invention, it will be obvious that various changes and modifications can be made therein without departing from the field of the invention which should be limited only by the scope of the appended claims.

I claim:

1. An adjustable baffle for a gaseous discharge device comprising; an envelope containing an anode, a cathode, and a control electrode; a baffle plate positioned between the cathode and the control electrode for directing a gaseous electrical discharge toward a selected region; and a plurality of bimetallic fingers positioned adjacent to a hole in the baffle plate, said bi-metallic fingers comprising thermal responsive elements which move into the discharge space when heated by said discharge.

2. An adjustable baffle for a gaseous discharge device comprising; an envelope containing an anode, a cathode, and a control electrode; a baffle plate positioned between the cathode and the control electrode for directing a gaseous electrical discharge toward a selected region; and a plurality of bi-metallic fingers projecting into a space which is normally traversed by the electrical discharge; said bi-metallic fingers comprising thermal responsive elements which produce an obstruction to the discharge when heated by the discharge.

3. An adjustable baffle for a gaseous discharge device comprising; an envelope containing an anode, a cathode, and a control electrode; a baffle plate positioned between the cathode and the control electrode for directing a gaseous electrical discharge toward a selected region adjacent to the control electrode; and a plurality of bi-metallic fingers secured to the baffle plate and projecting into a space which is normally traversed by the electrical discharge; said bi-metallic fingers comprising thermal responsive elements which produce an obstruction to the discharge when heated by the discharge.

4. An adjustable baffle for a gaseous discharge device comprising; an envelope containing an anode, a cathode, and a control electrode; a baffle plate positioned between the cathode and the control electrode for directing a gaseous electrical discharge toward a selected region adjacent to the control electrode; and a plurality of bi-metallic fingers secured to the control electrode and projecting into a space which is normally traversed by the electrical discharge; said bi-metallic fingers comprising thermal responsive elements which produce an obstruction to the discharge when heated by the discharge.

5. An adjustable baffle for a gaseous discharge device comprising; an envelope containing an anode, a cathode, and a control electrode; a baffle plate positioned between the cathode and the control electrode for directing a gaseous electrical discharge toward a selected region adjacent to the control electrode; and a plurality of bi-metallic fingers secured to the baffle plate and lying adjacent to the space which is normally traversed by the electrical discharge; said bi-metallic fingers comprising thermal responsive elements which move into said space when heated to an elevated temperature by the discharge to produce an obstruction to the discharge.

6. An adjustable baffle for a gaseous discharge device comprising; an envelope containing an anode, a cathode, and a control electrode; a baffle plate positioned between the cathode and the control electrode to form an enclosure through which an electrical discharge passes during a conduction period; and a plurality of bi-metallic thermal responsive fingers secured to the baffle plate and lying adjacent to said enclosure, said bi-metallic fingers secured to one end thereof so that the free end may move into the enclosure when heated to an elevated temperature by the discharge to produce an obstruction to the discharge.

References Cited in the file of this patent

UNITED STATES PATENTS

| | | |
|---|---|---|
| 1,941,567 | Marti | Jan. 2, 1934 |
| 2,162,478 | Diamond | June 13, 1939 |
| 2,412,751 | Rochester | Dec. 17, 1946 |